(12) United States Patent
Cornille et al.

(10) Patent No.: US 11,518,158 B2
(45) Date of Patent: Dec. 6, 2022

(54) METHOD FOR MANUFACTURING A SUB-ASSEMBLY FOR A TIRE COMPRISING A THREE-DIMENSIONAL FABRIC OR KNITTED MATERIAL AND USING A SECURING ELEMENT

(71) Applicant: COMPAGNIE GENERALE DES ETABLISSEMENTS MICHELIN, Clermont-Ferrand (FR)

(72) Inventors: Richard Cornille, Clermont-Ferrand (FR); Bastien Limozin, Clermont-Ferrand (FR); Sebastien Rigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 419 days.

(21) Appl. No.: 16/757,118

(22) PCT Filed: Oct. 18, 2018

(86) PCT No.: PCT/FR2018/052604
§ 371 (c)(1),
(2) Date: Apr. 17, 2020

(87) PCT Pub. No.: WO2019/077282
PCT Pub. Date: Apr. 25, 2019

(65) Prior Publication Data
US 2020/0238677 A1 Jul. 30, 2020

(30) Foreign Application Priority Data
Oct. 18, 2017 (FR) ...................................... 1759761

(51) Int. Cl.
*B32B 37/02* (2006.01)
*B32B 7/09* (2019.01)
(Continued)

(52) U.S. Cl.
CPC .............. *B32B 37/02* (2013.01); *B29D 30/30* (2013.01); *B29D 30/46* (2013.01); *B32B 5/024* (2013.01);
(Continued)

(58) Field of Classification Search
CPC ......... B32B 37/02; B32B 5/024; B32B 5/026; B32B 5/06; B32B 5/26; B32B 7/09;
(Continued)

(56) References Cited

U.S. PATENT DOCUMENTS 3,701,299 A * 10/1972 Stumpf .................. B65H 16/06
83/210
2018/0154694 A1 * 6/2018 Orlewski .................. B60C 7/14
(Continued)

FOREIGN PATENT DOCUMENTS

WO 2017/103490 A1 6/2017
WO 2017/103491 A1 6/2017

OTHER PUBLICATIONS

International Search Report dated Jan. 8, 2019, in corresponding PCT/FR2018/052604 (6 pages).
(Continued)

*Primary Examiner* — Cynthia L Schaller
(74) *Attorney, Agent, or Firm* — Venable LLP

(57) ABSTRACT

A method for manufacturing (S) a subassembly (3) for a tire (4) comprising the following substeps: providing an assembly comprising a supporting structure (14) comprising supporting filamentary elements linking a first structure (10) of filamentary elements and a second structure (12) of filamentary elements, aligning (S1) the first structure (10) and the second structure (12), securely fixing (S4) the first structure (10) onto the second structure (12) using a securing element (18), and cutting (S5) the assembly (1) along the securing element (18) so as to separate said securing element (18)
(Continued)

from the rest of the assembly (1) and to obtain at least one subassembly (3) without securing element (18).

13 Claims, 6 Drawing Sheets

(51) Int. Cl.
    *B29D 30/30*     (2006.01)
    *B32B 37/00*     (2006.01)
    *B32B 37/12*     (2006.01)
    *B32B 38/00*     (2006.01)
    *B29D 30/46*     (2006.01)
    *B32B 5/02*     (2006.01)
    *B32B 5/06*     (2006.01)
    *B32B 5/26*     (2006.01)
    *B32B 7/12*     (2006.01)

(52) U.S. Cl.
    CPC ................ *B32B 5/026* (2013.01); *B32B 5/06* (2013.01); *B32B 5/26* (2013.01); *B32B 7/09* (2019.01); *B32B 7/12* (2013.01); *B32B 37/0084* (2013.01); *B32B 37/12* (2013.01); *B32B 38/0004* (2013.01); *B32B 2038/008* (2013.01); *B32B 2250/20* (2013.01); *B32B 2260/048* (2013.01); *B32B 2605/08* (2013.01); *B32B 2605/18* (2013.01)

(58) Field of Classification Search
    CPC ....... B32B 7/12; B32B 37/0084; B32B 37/12; B32B 38/0004; B32B 2038/008; B29D 30/30; B29D 30/46; B29D 2030/463
    See application file for complete search history.

(56) References Cited

U.S. PATENT DOCUMENTS

2018/0361790 A1   12/2018   Rigo et al.
2018/0361791 A1   12/2018   Rigo et al.

OTHER PUBLICATIONS

A. Mountasir, et al., "Developent of multilayered woven panels with integrated stiffeners in the traverse and longitidinal directions for thermoplastic lightweight applications", Textile Research Journal, vol. 83, No. 14, pp. 1532-1540 (2013).

\* cited by examiner

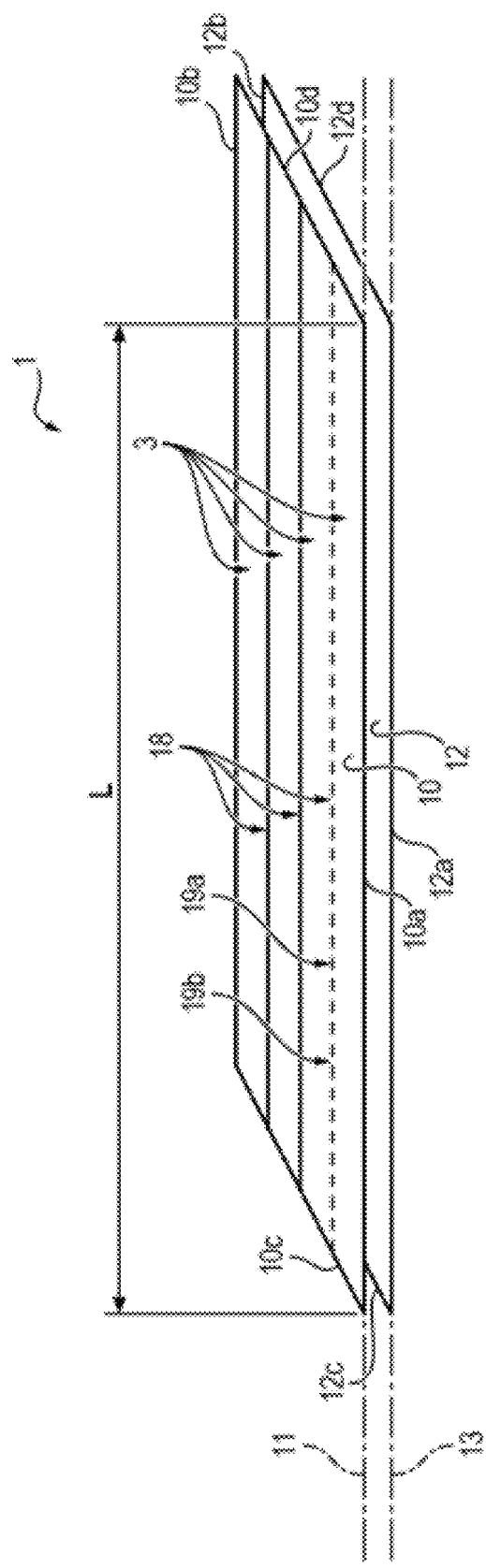

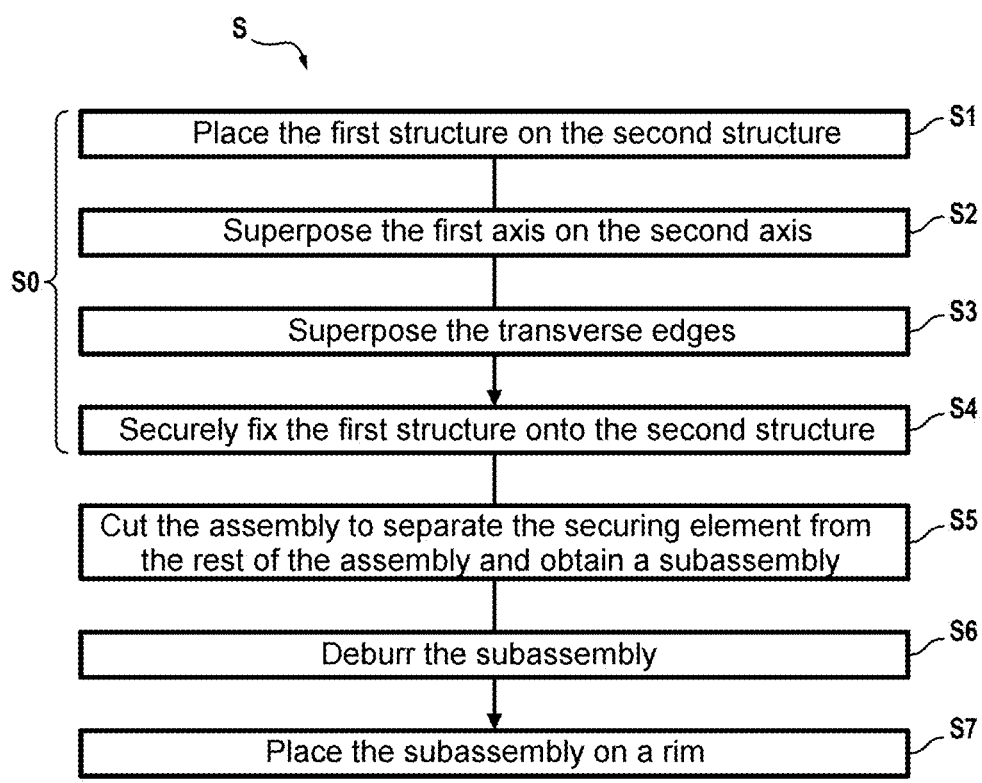

METHOD FOR MANUFACTURING A SUB-ASSEMBLY FOR A TIRE COMPRISING A THREE-DIMENSIONAL FABRIC OR KNITTED MATERIAL AND USING A SECURING ELEMENT

FIELD OF THE INVENTION

The invention relates generally to the field of tyres for a vehicle, typically a private passenger vehicle, a two-wheel vehicle, a heavy goods truck, an agricultural or civil engineering vehicle or an aeroplane, or, more generally, for any rolling device. More specifically, the invention relates to the flattening of such a tyre.

TECHNOLOGICAL BACKGROUND

A tyre 4 is a toroidal structure intended to be mounted on a rim, pressurized by an inflation gas and flattened on a ground under the action of a load.

As can be seen in FIG. 1 which illustrates an example of a tyre 4, a tyre 4 has a running surface (that is to say a surface intended to enter into contact with a ground), a running plane (that is to say a plane normal to the axis of revolution Y-Y' and which intersects the running surface), a circumferential axis X-X' (which corresponds to an axis of the running plane which is tangential to the running surface) and a radial axis Z-Z' (which corresponds to an axis transversal to the axis of revolution Y-Y' of the tyre 4 and which intersects the axis of revolution Y-Y').

As is known per se, the tyre 4 comprises, from the axis of revolution Y-Y' to its running surface, a carcass, a crown arranged radially on the outside of the carcass 3 and a tread 7.

The carcass is a structure of revolution comprising a carcass ply comprising carcass reinforcing elements. The carcass reinforcing elements are substantially parallel to one another in a given direction and form an angle greater than or equal to 65°, preferably greater than or equal to 80° and here more preferentially substantially equal to 90° with the circumferential axis of the tyre 4. The carcass reinforcing elements can notably comprise textile filamentary reinforcing elements, for example comprising two 144 tex polyester yarns wound with 290 turns together.

The crown 6 is a structure of revolution arranged radially on the outside of the carcass and comprises two working plies and one hooping ply.

Each working ply comprises working reinforcing elements. The working reinforcing elements are substantially parallel to one another in a direction and form an angle ranging from 15° to 40°, preferably ranging from 20° to 30° with the circumferential axis of the tyre 4 and here equal to 26°. The working reinforcing elements are crossed from one working ply to another. They can notably comprise metal filamentary reinforcing elements, for example cables of 2×0.30 mm structure.

The hooping ply is arranged radially on the outside of the working plies and comprises hooping filamentary reinforcing elements substantially parallel to one another forming an angle at most equal to 10°, preferably ranging from 5° to 10°, with the circumferential direction of the tyre 4, and here equal to 5°. The hooping reinforcing elements can comprise textile filamentary reinforcing elements, for example comprising two 167 tex aramid yarns wound with 315 turns together.

The tread 7 is arranged radially on the outside of the crown and is intended to enter into contact with a ground.

The running surface therefore corresponds to all or part of the radially outer face of the tread.

The carcass ply, the working plies and the hooping ply are produced in one or more polymeric compositions, for example elastomeric compositions, comprising at least one elastomer, preferably dienic, for example natural rubber, in which the corresponding reinforcing elements are embedded.

The tread 7 is produced in a polymeric composition, for example an elastomeric composition comprising at least one elastomer, preferably dienic, for example natural rubber.

In order to improve the flattening of the tyre 4, it has been proposed to replace all or part of the carcass with an assembly comprising a first structure formed by first filamentary elements, a second structure formed by second filamentary elements and a supporting structure comprising supporting filamentary elements linking the first structure and the second structure. The first structure and the second structure can be coated or impregnated with an elastomeric composition, typically rubber, for example by calendering.

This assembly can for example be formed by a three-dimensional fabric or a three-dimensional knit. Reference can notably be made to the documents WO 2017/103491 and WO2017/103490, in the name of the Applicant, which describe examples of assemblies and their manufacturing methods.

Such an assembly makes it possible to significantly improve the flattening of the tread when the tyre 4 is subjected to a load.

However, the Applicant found that the flattening of the tread was further improved when the top structure and the bottom structure of the assembly were perfectly aligned in the tyre 4. Now, it is commonplace, in the handling of the assembly, for one of the structures to slip relative to the other, so the supporting structure was not then taut so their relative movement could not therefore be prevented.

SUMMARY OF THE INVENTION

One aim of the invention is to propose a novel assembly, an associated producing method and a tyre and a method for manufacturing such a tyre, which make it possible to overcome the difficulties of alignment of the first structure and the second structure of the assembly in a simple, efficient and inexpensive way without in any way slowing down the manufacturing of the assembly and of the tyre, and which make it possible to guarantee that a tyre is obtained in which the flattening of the tread is significantly improved.

For that, the invention proposes a method for manufacturing a subassembly for a tyre comprising the following steps:

providing an assembly comprising a first structure, a second structure and a supporting structure, the first structure being formed by filamentary elements and having a longitudinal edge extending in a first direction which defines a first axis, the second structure being formed by filamentary elements and having a longitudinal edge extending in a second direction which defines a second axis, the supporting structure comprising supporting filamentary elements linking the first structure and the second structure, positioning the first structure on the second structure such that the first axis and the second axis are substantially parallel, and securely fixing the first structure onto the second structure using a securing element so as to hold the first structure in position relative to the second structure and to prevent any movement of the first structure relative to the second structure in order to obtain an assembly, and cutting the assembly along the securing element so as to separate said securing element from the rest of the assembly and to obtain at least one subassembly without securing element.

Some preferred but nonlimiting features of the manufacturing method described above are as follows, taken individually or in combination:

the method further comprises, prior to the fixing step, a step during which the first axis and the second axis are superposed.

the first structure and the second structure each comprise a transverse edge extending transversely to their respective longitudinal edge, the method further comprising, prior to the fixing, a step during which the transverse edge of the first structure and the transverse edge of the second structure are superposed.

the first structure having two opposing transverse edges, said transverse edges extending transversely to the longitudinal edge of the first structure, a length of the first structure being equal to a shorter distance between its transverse edges when the first structure is flat, and in which the first structure is fixed over all or part of its length onto the second structure.

the first structure is fixed over all or part of its length onto the second structure in a direction parallel to the first axis.

the first structure is fixed over at least 50% of its length onto the second structure.

the first structure is fixed discontinuously onto the second structure such that the securing element comprises at least two adjacent segments extending in the extension of one another.

the first structure is fixed onto the second structure along spot or linear segments.

the first structure is fixed onto the second structure using at least one of the following techniques: gluing, welding, stitching.

the first structure is securely fixed to the second structure using at least two distinct securing elements.

the first structure is fixed onto the second structure along at least two securing elements which extend substantially parallel to one another.

the cutting step comprises the following substeps: cutting the assembly along a first cutting line cutting the securing element along a first cutting line so as to obtain the subassembly without securing element, and cutting the securing element along a second cutting line so as to separate it from the rest of the assembly and form a second subassembly.

the substeps of cutting of the assembly along the first cutting line and along the second cutting line are performed simultaneously.

According to a second aspect, the invention also proposes a tyre having an axis of revolution and comprising:

a subassembly obtained in accordance with a manufacturing method as described above, and an annular space delimited radially by an inner face of the first structure and by an inner face of the second structure.

BRIEF DESCRIPTION OF THE DRAWINGS

Other features, aims and advantages will become more apparent on reading the following detailed description, and on looking at the attached drawings given as nonlimiting examples and in which:

FIG. 2 is a perspective view of an example of production of an assembly according to an embodiment of the invention, in which the supporting structure of the assembly has been omitted.

FIG. 3 is a flow diagram illustrating steps of a method for manufacturing a tyre according to an embodiment of the invention.

DETAILED DESCRIPTION OF AN EMBODIMENT

Assembly 1

Figure 1:
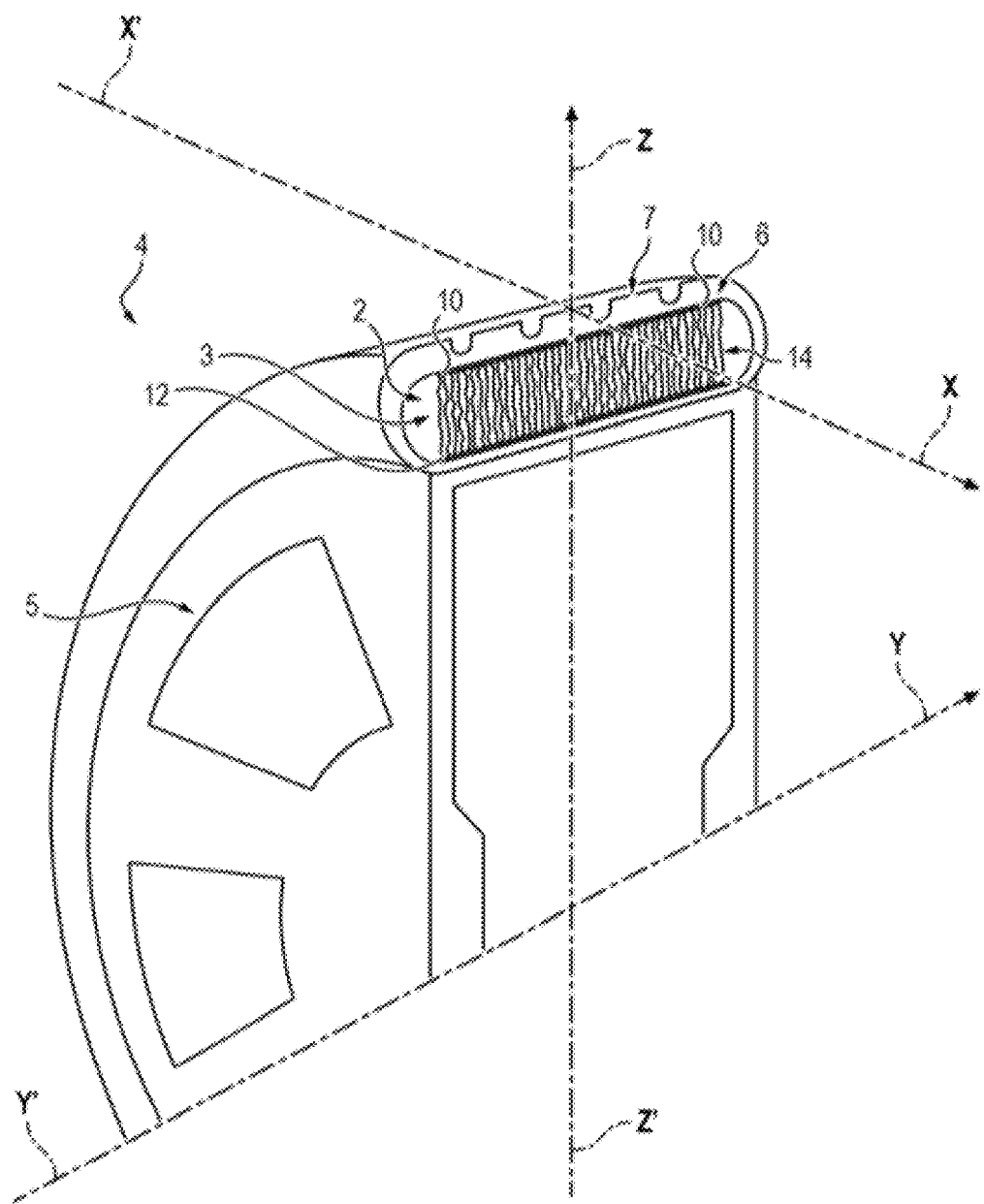
FIG. 1 is a perspective and partial cross-sectional view of an example of production of a tyre according to an embodiment of the invention represented in the absence of applied load and pressure.

The assembly 1 comprises:

a first structure 10 formed by filamentary elements, a second structure 12 formed by filamentary elements, and a supporting structure 14 comprising supporting filamentary elements linking the first structure 10 and the second structure 12.

Examples of assemblies 1 comprising these three structures 10, 12, 14 and that can be used have for example been described in detail in the documents WO2017/103490 and WO 2017/103491 described above.

More specifically, the first structure 10 is overall trapezoidal (for example parallelepipedal or rectangular) and has a first longitudinal edge 10a extending in a first direction which defines a first axis 11, a second longitudinal edge 10b opposite the first longitudinal edge 10a and two opposing transverse edges 10c, 10d, extending transversely to the first and second longitudinal edges 10a, 10b.

Similarly, the second structure 12 is overall trapezoidal (for example parallelepipedal or rectangular) and has a first longitudinal edge 12a extending in a second direction which defines a second axis 13, a second longitudinal edge 12b opposite the first longitudinal edge 12a and two opposing transverse edges 12c, 12d, extending transversely to the first and second longitudinal edges 12a, 12b.

In one embodiment, the first structure and the second structure 10, 12 can comprise a fabric formed by an interlacing of warp filaments (the filamentary elements of the first and second structure 10, 12) and of weft filaments. The assembly 1 is thus a three-dimensional fabric.

As a variant, the first structure and the second structure 10, 12 can comprise a knit, in which case the assembly 1 is a three-dimensional knit.

Whatever the production variant, the weave of the fabric of the first and/or of the second structure 12, 10 can be of canvas, serge, knit or satin. In the case of an assembly 1 for a tyre 4, a weave of canvas type makes it possible to achieve good mechanical performance levels.

According to yet another variant, one out of the first structure and the second structure 10, 12 comprises a fabric, the other out of the first structure and the second structure 10, 12 then being able to comprise a knit.

Typically, the assembly 1 can comprise a three-dimensional fabric or knitted fabric of single- or double-wall canvas weave type, such as, for example: the double-wall fabric PF-Farbroller-GR3-7103_01 marketed by the company PILE FABRICS GmbH; the knit N-02570-A01 marketed by the company HEATHCOAT FABRICS Limited.

The assembly 1 further comprises a securing element 18 securely fixing the first structure 10 onto the second structure 12 in order to prevent their respective movement such that the first axis 11 and the second axis 13 are parallel. It will of course be understood that, in this configuration, the first structure and the second structure 10, 12 are fixed to one another.

Preferably, the first axis 11 and the second axis 13 are further superposed and/or the first and second transverse edges 10a, 12a, 10b, 12b of the first structure and of the second structure 12, respectively, are superposed. Superposed will be understood here to mean that the first axis 11 and the second axis 13 (respectively the first and second transverse edges 10a, 12a, 10b, 12b) belong to a determined plane which corresponds to the plane passing through the first axis 11 (respectively the first transverse edge 10a or the second transverse edge 10b) and which is at right angles to the surface of the first structure 10 when the first structure 10 is placed flat on a flat surface.

The alignment tolerance of the first axis 11 and of the second axis 13 and the superpositioning tolerance of the edges (longitudinal 10a, 12a, 10b, 12b and/or transverse 10c, 12c, 10d, 12d) is less than or equal to two millimetres, preferably less than or equal to one millimetre.

In one embodiment, both the first axis 11 and the second axis 13 on the one hand and the transverse edges 10c, 10d, 12c, 12d of the first structure 10 and the second structure 12 on the other hand are superposed, so that the first structure and the second structure 10, 12 are perfectly superposed and aligned (with a tolerance less than or equal to two millimetres, preferably less than or equal to one millimetre). This further alignment is assured throughout the entirety of the handling of the assembly 1 until at least it is on a tyre 4 building drum 5, by virtue of the securing element 18 which enables the secure fixing thereof.

Figure 4A:
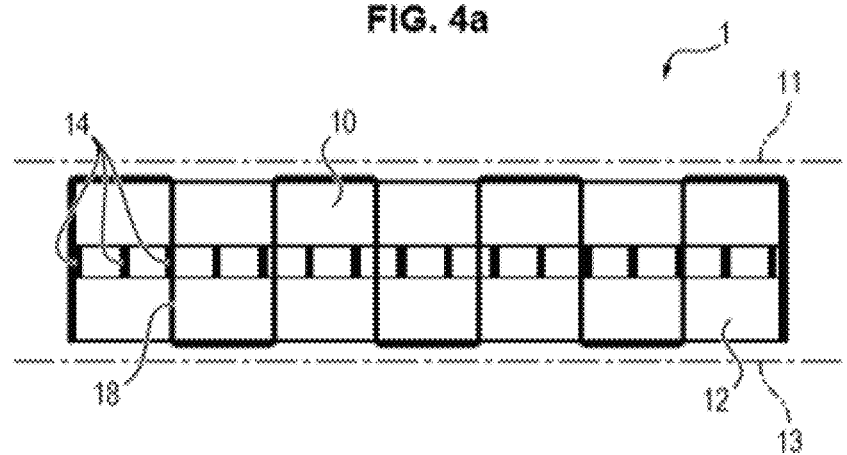
FIGS. 4a and 4b respectively illustrate a cross-sectional view along a securing element and a perspective view of a first example of production of an assembly which can be used in a manufacturing method according to the invention.
Figure 4B:
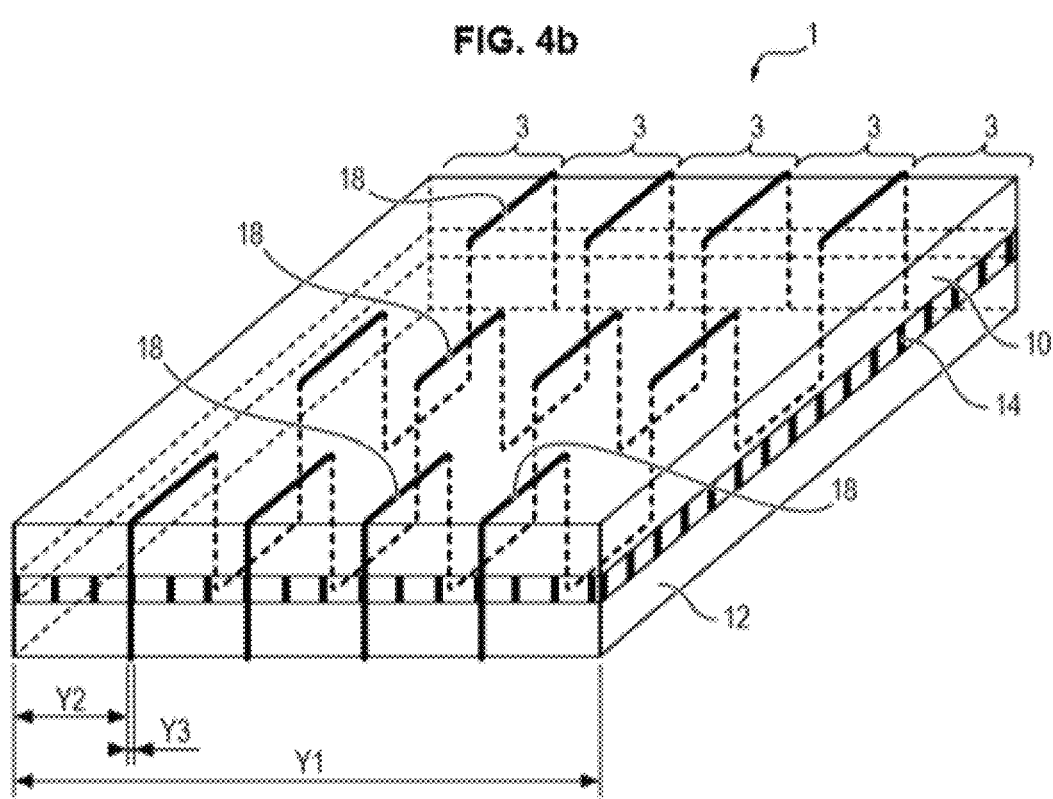

The securing element 18 can comprise at least one of the following elements: an adhesive 18 (as illustrated for example in FIGS. 6a and 6b), a weld line 18 (as illustrated for example in FIGS. 5a and 5b) and/or a stitching thread 18 (as illustrated for example in FIGS. 4a and 4b). A combination of these elements within one and the same assembly 1 can of course be envisaged.

Figure 6A:
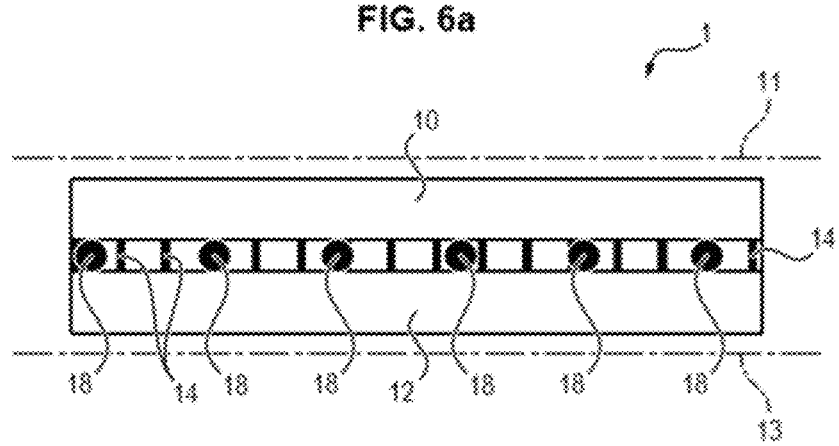
FIGS. 6a and 6b respectively illustrate a cross-sectional view along a securing element and a perspective view of a third exemplary embodiment of an assembly that can be used in a manufacturing method according to the invention.
Figure 6B:
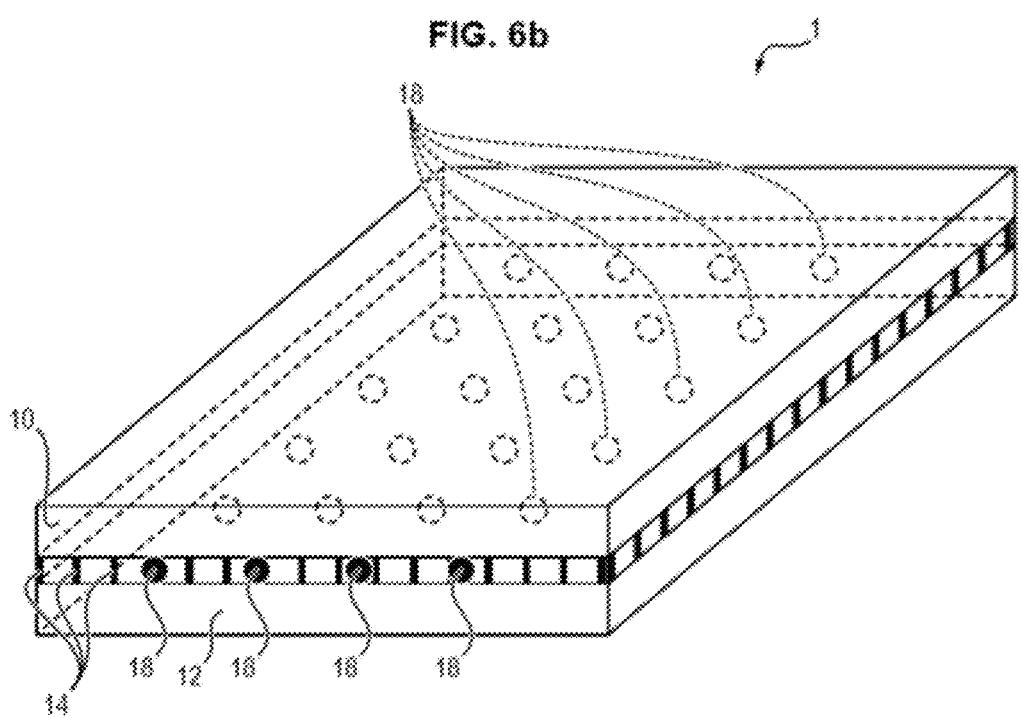

Preferably, the adhesive 18 comprises a non-intrusive glue from the industrial point of view. For example, the adhesive 18 can comprise a glue such as, for example, loctite 3421 A&B. Depending on the type of glue, a step of polymerization of the glue can be envisaged. The adhesive 18 can then be applied in spots, as illustrated in FIGS. 6a and 6b, or linearly (not visible in the figures).

Figure 5A:
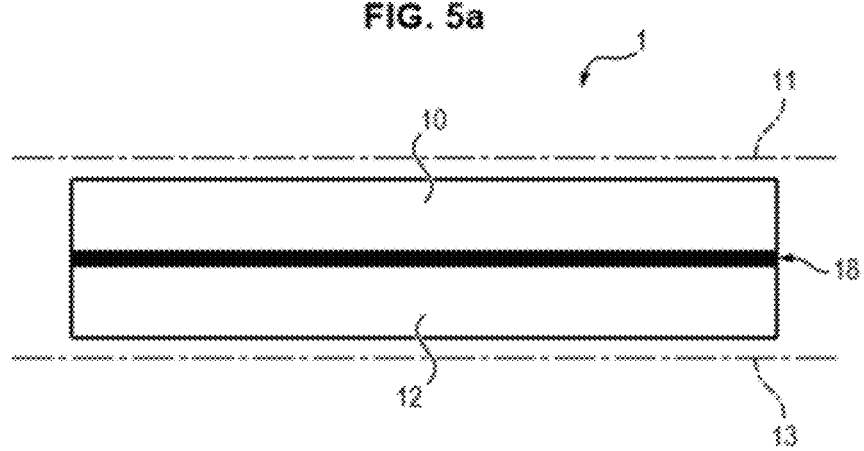
FIGS. 5a and 5b respectively illustrate a cross-sectional view along a securing element and a perspective view of a second exemplary embodiment of an assembly that can be used in a manufacturing method according to the invention.
Figure 5B:
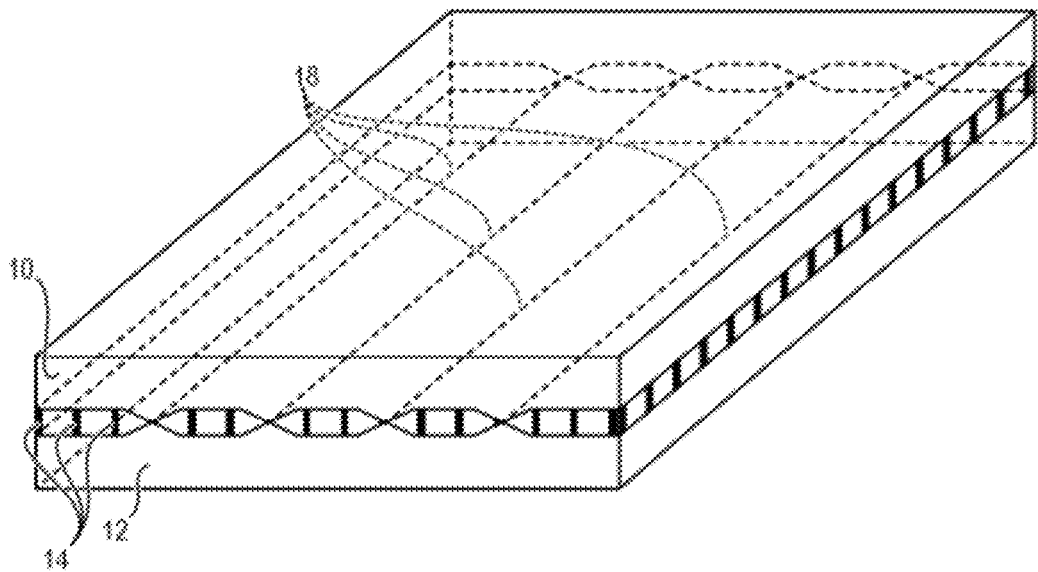

The weld line 18 can be produced for example by ultrasound welding, by heating blade, by laser or by high frequencies. In FIGS. 5a and 5b, the weld lines 18 are continuous. That is however not limiting, the weld lines 18 being able to be discontinuous, as will be seen hereinbelow.

The stitching can be done using a thread 18 capable of withstanding the gluing temperatures. Preferably, the stitching thread therefore has a melting point greater than 200° C.

Typically, some polyamides and polyesters can be used. The stitching thread 18 is then interlaced with the filamentary elements of the first structure 10 and with the filamentary elements of the second structure 12, so as to keep them securely fixed. An example of interlacing is for example illustrated in FIGS. 4a and 4b. In this example, the interlacing is done according to a regular pitch: an irregular or periodic pitch can however also be envisaged.

In one embodiment, the securing element 18 extends along an axis parallel to the first axis 11 and to the second axis 13. As will be seen hereinbelow, such a configuration of the securing element 18 then makes it possible to limit the subassembly 1 drops during the production of a subassembly 3 1 in order to produce a tyre 4.

In all cases, the securing element 18 can be definitive, that is to say that it does not break when it is subjected to normal handling in the production of the assembly 1, in its handling, its placement on the rim. Moreover, the securing element 18 is preferably fixed relative to the first structure and the second structure 10, 12 and non-elastic (that is to say that its length is constant in normal conditions of use).

The securing element 18 can extend continuously or discontinuously between the transverse edges of the first and second structures 10, 12.

Continuous will be understood here to mean that the securing element 18 extends over all the length L of the first structure 10 (which corresponds to the smallest distance between the transverse edges 10c, 10d of the first structure 10 when the first structure 10 is flat or, more simply, to the length L of its longitudinal edges 10a, 10b when the first structure 10 is parallelepipedal or rectangular).

Discontinuous will be understood here to mean that the securing element 18 extends over only a part of the length L of the first structure 10, preferably over at least 50% of its length L. In this case, as illustrated for example in FIG. 2, the securing element 18 preferably comprises at least two adjacent segments 19a separated by a distance 19b. In order to guarantee that the first structure 10 and the second structure remain perfectly aligned and superposed at all points of the assembly 1, even when the assembly 1 is being handled, the distance 19b can notably be at most equal to a metre. In one embodiment, the distance 19b is less than a meter, preferably less than 75 cm. The segments 19a can be spot segments, that is to say that their greater dimension is of the order of a few millimetres, or be linear, that is to say that their greater dimension is equal to several centimetres or even metres. In order to cover at least 50% of the length L of the first structure 10, it will be understood that the number of segments 19a of the securing element 18 increases as their dimension decreases.

The width y3 (dimension in the plane of the first structure 10 and extending in a direction at right angles to the longitudinal edges 10a, 10b of the first structure 10) of the securing element 18 can be continuously over the length L of the first structure 10, or variable. A continuous width y3 is however easier to produce industrially.

The securing element 18 can extend along and adjacent to one of the longitudinal edges 10a, 10b of the first structure 10, or as a variant, at a distance from said longitudinal edge 10a, 10b.

Moreover, depending on the width y2 desired for the subassembly 3 1, the assembly 1 can comprise one or more securing elements 18.

The width y3 of the securing element 18 and the width y1 of the first structure 10 will be able to be easily determined by a person skilled in the art, and depends notably:

on the width y2 of the subassemblies 3 to be produced in the assembly 1. Typically, if an operator wants to obtain a subassembly 3 in which the width y2 is greater than half the width y1 of the transverse edges 10c, 10d of the first structure 10, the width y3 of the securing element 18 will be able to be at most equal to the difference between the width y1 of the first structure 10 and the width y2 of the subassembly 3 (bearing in mind that it is possible to envisage providing a margin in order to ensure the possibility of deburring S6 the subassembly 3 1 obtained). Similarly, if an operator wants to obtain n subassemblies 3, the width y1 of the assembly is chosen so as to be at least equal to the sum n*y2+(n−1)*y3, it being recalled that y2 is the width desired for the subassembly 3 and y3 is the width necessary for the securing elements 18. In practice, in order to reduce drops, the width y1 of the first structure 10 is chosen so as to be substantially equal to the sum n*y2+(n−1)*y3.

on the type of securing element 18 used.

on the continuous or discontinuous nature of the securing element 18, and, if appropriate, on the distance 19b between two segments 19a of securing elements 18.

Optionally, the outer face (that is to say the face opposite the space 2 formed between the first structure and the second structure 10, 12) of the first structure 10 and the second structure 12 can be impregnated with an elastomeric composition.

Method for Producing S0 an Assembly 1

An example of producing S0 such an assembly 1 will now be described.

During a first step S1, a set comprising a first structure 10, a second structure 12 and a supporting structure 14 is supplied. This set is generally produced beforehand as is known per se and/or can be supplied in roll form, for example from the companies PILE FABRICS GmbH or GIRMES INTERNATIONAL GmbH.

In the case where the set is supplied in the form of a roll, the set is unwound and placed flat so that one out of the first structure and the second structure 10, 12 is located on a support surface. In this position, the first structure and the second structure 10, 12 are therefore stacked on the support surface, the filamentary elements of the supporting structure 14 being already interlaced with the filamentary elements of the first and second structure 12.

During a second step S2, the position of the first structure and of the second structure 10, 12 is adjusted so that the first axis 11 and the second axis 13 are parallel, and, if necessary, superposed. Optionally, during a third step S3, their position is also adjusted so that their first transverse edges 10c, 12c and/or their second transverse edges 10d, 12d are superposed.

Preferably, the position of the first structure and of the second structure 10, 12 is adjusted so that the first axis 11 and the second axis 13 are parallel and superposed and that their first transverse edge and second transverse edge 10c, 10d, 12c, 12d are superposed. It will of course be understood that the steps S1, S2 and S3 can be performed simultaneously or in succession, in which case these steps S1, S2 and S3 can be implemented in a different order without in any way departing from the scope of the invention.

In these steps S1, S2 and/or S3, the first structure and the second structure 10, 12 can be flat over all their length L, or, as a variant, the set can be unwound only partly, the rest of the set being unwound as required during the third step of the method S0.

During a fourth step S4, the first structure and the second structure 10, 12 are fixed securely by at least one securing element 18 so as to prevent their respective movement.

The first structure and the second structure 10, 12 can be fixed securely by a single securing element 18 in order to prevent their respective movement. As a variant, the first structure and the second structure 10, 12 can be fixed securely by several distinct securing elements 18. In this case, the distinct securing elements 18 extend preferably parallel to one another, in order to optimize the number of subassemblies 3 likely to be manufactured from the assembly 1.

The fixing S4 can be done by gluing (in which case the securing element 18 comprises an adhesive 18) (see for example FIGS. 6a and 6b), by ultrasound welding (in which case the securing element 18 comprises a weld line 18) (see for example FIGS. 5a and 5b) and/or by stitching (in which case the securing element 18 comprises a stitching thread 18) (see for example FIGS. 4a and 4b).

As variant, the steps S1 to S4 can be performed directly by the weaver in the loom used for the production of the set, in order to guarantee that the first structure and the second structure 10, 12 are perfectly aligned and to avoid winding and unwinding operations that are likely to generate alignment difficulties.

Optionally, the outer face of the first structure 10 and the second structure 12 can be impregnated with an elastomeric composition, typically rubber, for example by calendering. This impregnation can be done after the secure fixing S4 of the first structure and second structure 12 by the securing element 18.

If appropriate, the assembly 1 can then be handled and notably wound around a cylinder for the storage thereof prior to its use. This handling is notably facilitated by the secure fixing of the first structure 10 with the second structure 12, which prevents any slippage of one of the structures 10, 12 relative to the other 12, 10.

Method for Manufacturing a Tyre 4

The assembly 1 thus obtained can notably be used in the manufacture of a tyre 4.

For that, during a fifth step S5, the securing element 18 is separated from the first structure and second structure 12, for example by cutting.

The cutting of the securing element 18 can be performed in a single step or in several steps, for example by simultaneously or successively cutting the assembly 1 on either side of the securing element 18, over all the length L of the first structure 10.

After cutting S5, there is then obtained at least one subassembly 3 1, comprising the part of the first structure 10, of the second structure 12 and of the supporting structure 14 which extended from one of the longitudinal edges 10a, 10b of the first structure 10 to the securing element 18.

When the assembly 1 comprises several securing elements 18, these securing elements 18 can be separated S5 simultaneously or successively from the rest of the assembly 1, so as to form several subassemblies 3.

During an optional sixth step S6, the subassembly or subassemblies 3 can be deburred.

During a seventh step S7, one of the subassemblies 3 thus obtained is then placed on a building drum 5 in order to produce a tyre 4.

It will be noted in particular that the secure fixing of the first and second structures 10, 12 using securing elements 18 using the securing elements 18 makes it possible to guarantee the correct positioning of the first structure 10 relative to the second structure 12 until they are placed on the building drum 5, even if this removal occurs before said placement, the risks of slippage of the first structure 10 relative to the second structure 12 (or vice-versa) being primarily due to the handling and the storage of the assembly 1.

During an eighth step (see FIG. 1), an annular space 2 radially delimited by an inner face of the first structure 10 and an inner face of the second structure 12 is formed. The annular space 2 can for example be formed by inflation. During a ninth step, the tyre 4 is then formed by adding and successively fixing a crown and a tread. The crown 6 and the tread 7 can be conventional.

Reference will notably be able to be made to the documents WO2017/103490 and WO 2017/103491 described above for more details on the means for manufacturing a tyre 4 with such an assembly 1.

The invention claimed is:

1. A method for manufacturing a subassembly for a tire comprising the following steps:
    providing an assembly comprising a first structure, a second structure and a supporting structure, wherein the first structure is formed by filamentary elements and has a longitudinal edge extending in a first direction which defines a first axis, wherein the second structure is formed by filamentary elements and has a longitudinal edge extending in a second direction which defines a second axis, and wherein the supporting structure comprises supporting filamentary elements linking the first structure and the second structure;
    positioning the first structure on the second structure such that the first axis and the second axis are substantially parallel to each other;
    securely fixing the first structure onto the second structure using a securing element so as to hold the first structure in position relative to the second structure and to prevent any movement of the first structure relative to the second structure; and
    cutting the assembly along the securing element so as to separate the securing element from a rest of the assembly and to obtain at least one subassembly without a securing element.

2. The method for manufacturing a subassembly according to claim 1, further comprising, prior to securely fixing the first structure onto the second structure, superposing the first axis and the second axis.

3. The method for manufacturing a subassembly according to claim 1, wherein the first structure and the second structure each comprise a transverse edge extending transversely to the respective longitudinal edge, the method further comprising, prior to securely fixing the first structure onto the second structure, superposing the transverse edge of the first structure and the transverse edge of the second structure.

4. The method for manufacturing a subassembly according to claim 1, wherein the first structure has two opposing transverse edges, the transverse edges extending transversely to the longitudinal edge of the first structure, and a length of the first structure being equal to a shorter distance between the transverse edges of the first structure when the first structure is laid flat, and
    wherein the first structure is fixed over all or part of the length of the first structure onto the second structure.

5. The method for manufacturing a subassembly according to claim 4, wherein the first structure is fixed over all or part of the length of the first structure onto the second structure in a direction parallel to the first axis.

6. The method for manufacturing a subassembly according to claim 5, wherein the first structure is fixed over at least 50% of the length of the first structure onto the second structure.

7. The method for manufacturing a subassembly according to claim 6, wherein the first structure is fixed discontinuously onto the second structure such that the securing element comprises at least two adjacent segments extending in an extension of one another.

8. The method for manufacturing a subassembly according to claim 7, wherein the first structure is fixed onto the second structure along a spot or along linear segments.

9. The method for manufacturing a subassembly according to claim 1, wherein the first structure is fixed onto the second structure using a technique selected from the group consisting of gluing, welding, stitching and combinations thereof.

10. The method for manufacturing a subassembly according to claim 1, wherein the first structure is securely fixed to the second structure using at least two distinct securing elements.

11. The method for manufacturing a subassembly according to claim 10, wherein the first structure is fixed onto the second structure along at least two securing elements which extend substantially parallel to one another.

12. The method for manufacturing a subassembly according to claim 1, wherein the cutting step comprises the following substeps:
    cutting the securing element along a first cutting line so as to obtain the subassembly without the securing element; and
    cutting the securing element along a second cutting line so as to separate it from the rest of the assembly and form a second subassembly.

13. The method for manufacturing a subassembly according to claim 12, wherein the substeps of cutting of the assembly along the first cutting line and along the second cutting line are performed simultaneously.

\* \* \* \* \*